United States Patent [19]

Whitehurst

[11] Patent Number: 4,631,851
[45] Date of Patent: Dec. 30, 1986

[54] COMBINATION FISHING NET, WEIGHT SCALE AND LENGTH SCALE

[76] Inventor: Wendell P. Whitehurst, #5 Larkin Dr., Little Rock, Ark. 72212

[21] Appl. No.: 862,473

[22] Filed: May 12, 1986

Related U.S. Application Data

[63] Continuation-in-part of Ser. No. 658,202, Oct. 5, 1984.
[51] Int. Cl.$^4$ .............................................. A01K 71/00
[52] U.S. Cl. ............................................... 43/7; 43/11
[58] Field of Search ................. 43/7, 11, 12; 177/232, 177/233

[56] References Cited

U.S. PATENT DOCUMENTS

| 622,619 | 4/1899 | Granat | 177/232 |
| 2,633,351 | 3/1953 | Fowle | 43/11 |

Primary Examiner—Nicholas P. Godici
Assistant Examiner—K. Rowan
Attorney, Agent, or Firm—Stephen D. Carver

[57] ABSTRACT

A combination fish landing net, weight scale, and length scale for use by fishermen to obtain accurate fresh weight and length measurements of a captured fish immediately after netting. A flexible mesh net is secured upon a generally circular, tubular hoop. A rigid plug secured in the interior of the hoop by a pair of screws may be removed to permit removal and replacement of a damaged net. The compressed hoop ends are secured by a rigid rivet to one end of an expansible, steel spring and fitted in coaxial relation into the interior of a rigid, phosphorescent, plastic tube. The spring is secured within the tube by a rigid pin. A pair of parallel rectangular clearance slots are cut in opposite sides of the tube. The tube is coaxially, telescopingly fitted within a rigid, elongated, tubular handle of a highly contrasting color. A rigid steel fastener passes through the handle between the clearance slots of the tube to capture the opposite end of the spring. The device can thus be assembled without tensioning of the spring. Downward movement of the highly visible intermediate tube within the handle in response to the weight of a netted fish is visible through a pair of parallel, elongated, rectangular windows on the face of the handle. Length may be measured by numerical weight scale calibrations legible on the surface of the handle between the windows. When the device is correctly assembled, the hoop rests in coplanar alignment with the rivet, the pin, the fastener, and the windows. A length scale is provided on the rear face of the handle to permit the fisherman to obtain an accurate length measurement without having to remove the fish from the net.

8 Claims, 12 Drawing Figures

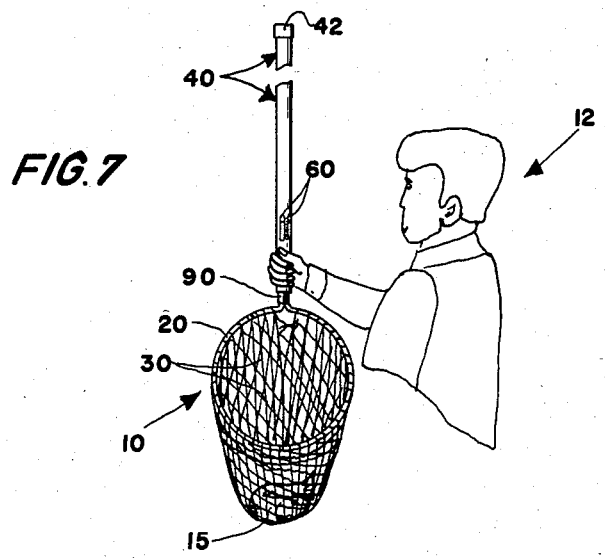
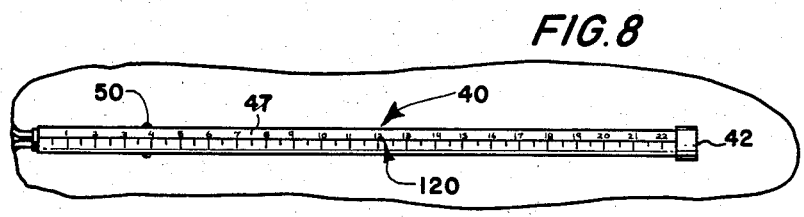
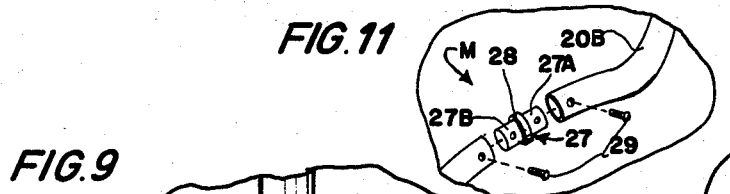
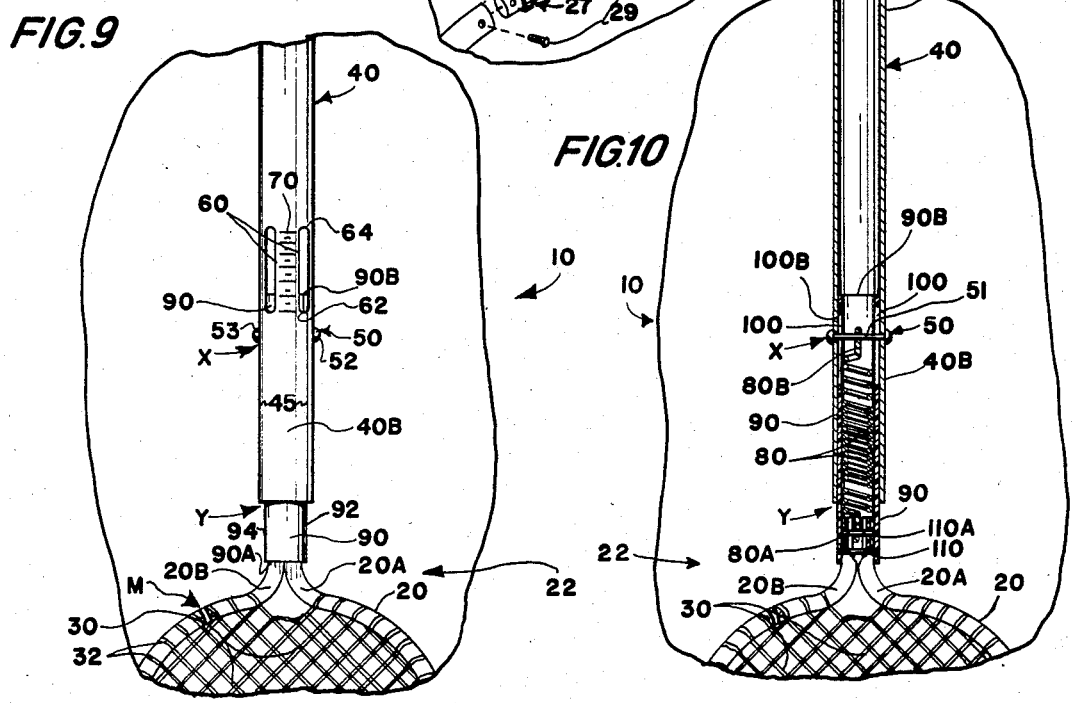

COMBINATION FISHING NET, WEIGHT SCALE AND LENGTH SCALE

CROSS REFERENCE TO RELATED APPLICATION

This application is a continuation-in-part of the previously filed parent application, Ser. No. 06/658,202, abandoned filed by the same applicant herein, Wendell P. Whitehurst, on Oct. 5, 1984 and entitled COMBINATION FISHING NET, WEIGHT SCALE AND LENGTH SCALE.

BACKGROUND OF THE INVENTION

It has long been recognized by those skilled in the art of game fishing that it is most desirable to weigh the catch and to measure its length as soon as possible after netting. The fisherman thus obtains the proper "fresh" weight and length measurements before drying or deterioration can effect a reduction of the size of the catch. Accurate measurements are particularly important to the competitive tournament fisherman whose measurement error could result in the loss of tournament points or the accrual of penalty points. Careful measurements are also required in regions where State Game and Fish Commissions limit the catch to fish of a particular length and weight.

In the prior art a number of fishing net devices exist which are combined with devices for measuring the weight or length of the catch. However, certain disadvantages and problems have not yet been satisfactorily addressed in the prior art combinations known to me.

For example, Borgardt, U.S. Pat. No. 1,088,766, issued Mar. 3, 1914, discloses a landing net with a locking, telescopic handle which has length scale calibrations on the interior handle. The landing net described by Hedges, U.S. Pat. No. 2,129,469, issued Sept. 6, 1938, includes a weight scale which is secured within an elongated handle and connected thereto by an expansible spring. While the net is in use, the scale of the U.S. Pat. No. 2,129,469 device is locked into a closed position with a hook. When the fish is netted, the hook can be released, so that the weight of the netted fish pulls downwardly on the handle, extending the handle apart from the interiorly disposed scale. The scale markings correspond to the length of extension of the handle from the interior scale. No means for length measurements are provided by Hedges.

Similarly, Fowle, U.S. Pat. No. 2,633,351, issued Mar. 31, 1953, discloses a fishing scale comprising a net, hoop, and an elongated handle. A manually adjustable interior spring connects the slidable, interior plunger of the handle to the net hoop, so that the weight of a captured fish pulls the plunger away from the outer cylinder of the handle. Weight scale calibrations corresponding to the length of extension of the spring are permanently marked upon the surface of the interior plunger and are viewed through a rectangular window slot cut through the wall of the outer cylinder. The Fowle device also fails to provide means for measuring the length of the captured fish.

U.S. Pat. No. 3,082,561, issued to Convey on Mar. 26, 1963, discloses a distinct combination net and weight scale. The device includes a net and an elongated handle. A flat, hardened strip of steel affixed to the spring extends between the net and the elongated handle. Disposed adjacent to the spring below the handle is an indicator element on which weight scale calibrations are marked. When a fish is captured in the net, the net expands downwardly and pulls the flat steel strip downwardly across the scale markings. The Convey device likewise provides no means for length measurement.

A prior art landing net which combines weight and length measurement functions is described by Nakayama, U.S. Pat. No. 3,077,237, issued Feb. 12, 1963. The latter reference discloses an expansible spring which moves a needle indicator around the face of a circular dial recessed within the handle responsive to the downward pull of the fish on the hoop of the landing net. Length scale markings are indicated on the upper surface of the elongated handle.

A weighing device disclosed by Granat, U.S. Pat. No. 622,619, issued Apr. 4, 1899 includes some features of general relevance to the present invention. An expansion spring is secured within an elongated tube disposed within the handle and connected to the segmented scoop portion. When the scoop is filled, force is exerted upon the inner spring, the spring expands and the tube which surrounds the spring is pulled out from within the handle. A weight indicator arrow which is connected to the scoop portion is pulled along weight scale markings legible on the outer surface of the handle independent of the interior shaft. The device provides a lengthwise slot in the handle portion to permit movement of the interior fastener responsive to the pivotal motion of the scoop.

Other prior art devices of somewhat less relevance include Fox, U.S. Pat. No. 2,664,320, issued Dec. 29, 1953; Foster, U.S. Pat. No. 3,803,742, issued Apr. 16, 1974; and U.S. Pat. No. 4,301,650, issued June 28, 1977 to Popeil.

Several major disadvantages of the prior art fish net and measurement combinations are readily observable. In my opinion none of the spring-type scales of these prior art devices are properly secured. They are therefore susceptible to overextension, and they are subject to inaccuracy and inordinate wear due to the lack of means for controlling torsional displacement of the extensible weight scale portions. The accuracy of these devices is particularly affected when they are used for netting heavier fish. The steel strip scale of the Convey U.S. Pat. No. 3,082,561 device is likewise easily subject to distension from multiple nettings of heavy fish. Prior art weight scales are difficult to manage, are poorly legible, and are subject to inaccuracies from exposure to the harsh environmental conditions which a fisherman normally encounters. The length scales provided in the prior art devices are poorly placed and not easily legible without extensive manipulation or removal of the fish from the landing net.

As will be appreciated by those experienced in competitive sports fishing, the flexible nets of mesh or similar materials may become stretched out of shape or accidentally torn and thus unusable for tournament fishing. No adequate solution has been provided in the prior art for this rather common occurrence. The serious competitive fisherman is thus left with the sole inconvenient alternative of carrying along a number of suitable landing net combinations in order to assure a successful fishing operation without equipment failure. It would be clearly advantageous to provide means for quickly and easily removing the damaged net and connecting a new net portion onto the hoop of the existing landing net. A fisherman could much more conveniently store and transport a supply of the small, flexible nets than he could a number of landing net combinations. However, none of the prior art devices known to me so facilitates a "quick change" of the net portion.

SUMMARY OF THE INVENTION

The present invention comprises a fish landing net in combination with an interior spring scale for weighing fish and a scale for measuring fish length.

An associated flexible net made of a material of suitable flexibility and tensile strength for capturing game fish is attached to a hoop of generally circular configuration formed of a unitary length of lightweight tubing. The ends of the tubing are drawn together to close the circle of the hoop and are secured together by a rigid pin which passes through the hoop ends in coplanar alignment with the rim of the hoop. The hoop ends are compressed in a generally concave configuration to a slightly reduced diameter, so that the ends may be coaxially fitted into the lower end of an elongated intermediate tube of slightly greater diameter which is made of a rigid, phosphorescent or similarly highly visible plastic material.

The hoop ends are secured within the tube by a rigid rivet in generally parallel alignment with the aforementioned pin, and is likewise positioned in coplanar alignment with the rim of the hoop. The rivet passes through the walls of the lower end of the elongated tube and through the lower portion of the hoop ends, near the close of the hoop.

A pair of elongated clearance slots are cut in parallel alignment through opposite sides of the upper end of the elongated tube. The clearance slots are less than half the length of the tube. This elongated tube is preferably injection-molded to fit precisely in slidable, coaxial relation into the lower end of the rigid, hollow, elongated handle.

The handle is made of a unitary, tubular, lightweight material such as aluminum which is of suitable strength to support a netted fish and which is coated with a color which clearly contrasts with that of the interior tube. A pliable cap is fitted to the upper end of the handle to cover the exposed cut edges to assure the safety and comfort of the user.

The present invention includes a separable hoop portion, which permits the fisherman to open the hoop and easily replace the flexible net when it becomes stretched, weakened, or torn. The hoop is severed near the handle of the landing net. A rigid plug is coaxially inserted within the interior of the hoop to operatively connect two intermediate end sections of the hoop.

The plug comprises two rigid ends which have an outer diameter smaller than the interior diameter of the hoop, and a central flange centered between the ends which has an outer diameter approximately equal to the outer diameter of the hoop. Thus when the hoop is closed, the plug is positioned with its end portions extending into the interior of the hoop and the flange extends out even with the outer diameter of the hoop, thus providing a smooth bridge between the two hoop sections. The plug is secured in place by a pair of screws which extend through the upper surface of the hoop into the shaft of the plug, so that the plug can be quickly and easily removed, the hoop opened, and the damaged net removed. Once the new net is properly in place upon the hoop, the plug can be easily reinserted into the hoop and secured in place with the screws.

On the front face of the handle a pair of elongated, adjacent rectangular windows reveal the contrasting interior tube disposed within the handle. Numerical weight scale calibrations beginning at a zero point are clearly legible on the surface of the handle between the windows. The positioning of the scale calibrations between the windows greatly facilitates accurate reading of the weight scale. The weight scale calibrations correspond to degrees of movement of the interior tube from within the handle as hereinafter described. Calibrated markings for length measurement beginning at a zero point and increasing up the handle away from the hoop are clearly indicated in a contrasting color on the opposite, rear face of the tubular handle. The placement of the length scale on the opposite face of the net permits the user to simply maneuver the netted fish and obtain both weight and length measurements at essentially the same time.

The weighing function of the present landing net combination is achieved through an expansible, preferably steel, spring which is coaxially disposed within the interior of the rigid tube. The spring terminates at each end in a rigid loop. The spring loop on the lower end of the spring nearest the hoop encircles the pin which secures the hoop ends as previously described.

The spring loop on the opposite, upper end of the spring is secured by a carriage fastener which penetrates opposite walls of the handle and is fitted between the clearance slots cut in the elongated interior tube. This structure permits longitudinal movement of the interior tube relative to the handle responsive to the weight of a netted fish. The fastener secures the tube within the interior of the handle and functions to prevent torsional displacement of the tube within the handle while the net is in use, so that a more consistently accurate weight reading can be achieved.

Operationally, when a fish is netted, the combination landing net of the present invention may be grasped with its tubular handle extending toward the user and the net portion extended away from the user in a "horizontal" position generally perpendicular to the body of the fisherman for retrieving the fish from the water. When a fish has thus been properly netted, the user may then easily manipulate the landing net to a "vertical" position, whereby the elongated handle is firmly grasped by the fisherman and pointed upwardly and the flexible net and hoop portion extend downwardly. Thus the net is effectually "closed" so that the netted fish cannot escape.

The weight of the netted fish expands the interiorly disposed spring so that the hoop and the interior tube telescopingly extend from within the tubular handle. The movement of the contrasting interior tube is clearly seen through the rectangular windows of the handle, so that the weight scale markings, which are directly adjacent to the windows on the face of the handle, may be easily read. The weight scale markings accurately correspond to the relative downward movement of the hoop portion from within the handle.

With a simple manipulation of the landing net device, the fisherman can then immediately accurately determine the length of the netted fish. When the device is rotated approximately 180 degrees so that the elongated handle extends downwardly and the hoop portion is elevated above the handle, the weight of the netted fish pulls the flexible net downwardly, so that the net drapes across the length scale calibrations provided on the face of the handle opposite the weight scale. By merely holding the fish in position against the scale, the fisherman can easily obtain an accurate length measurement. This manipulation can be accomplished with relative ease without permitting the net to fall open and risking the possible escape of the captured fish.

Thus, a broad object of the present invention is to provide a fish landing net of the nature described which incorporates both a weighing device and means for measuring length.

A similar broad object of the present invention is to provide a fish landing net of the nature described which permits the competitive fisherman to easily obtain accurate measurements of the weight and length of a captured fish immediately after netting.

A further broad object of the present invention is to provide a fish landing net of the nature described which is lightweight and easily transportable.

A more fundamental object of the present invention is to provide a fish landing net with an improved weight scale which is more accurate, easier to manipulate, and more easily legible.

A further object of the present invention is to provide a combination fish landing net of the nature described which is more resistant to wear caused by constant exposure to the environment.

Yet another object of the present invention is to provide a fish landing net combination with a separable hoop portion whereby the flexible net can be easily removed and replaced when damaged.

A similar object of the present invention is to provide a fish landing net which incorporates an interior spring secured so as to prevent inaccurate measurement caused by torsional displacement of the spring within the handle.

A further object of the present invention is to provide a fish landing net with a clearly legible length scale which can be used without removing the captured fish from the net.

Yet another object of the present invention is to provide a combination fish landing net in which the interior weight spring is encased within a rigid protective tube and coaxially secured within the handle.

A similar object of the present invention is to provide a fish landing net with improved weighing means which can withstand wear from continual use for netting large or heavy fish.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 7 is a pictorial view of the best mode of the present invention in use;

FIG. 8 is an enlarged scale, partial view of the length measurement portion of the handle;

FIG. 9 is an enlarged scale, partial view of the lower portion of the device similar to FIG. 1, illustrating the weight scale portion in its extended position;

FIG. 10 is an enlarged scale, sectional, partial view similar to FIG. 3, illustrating the weight scale portion in its extended position as in FIG. 8; and, FIG. 11 is an enlarged scale, exploded, partial view of the hoop portion of the device, illustrating the plug of the separable hoop portion.

DETAILED DESCRIPTION OF THE DRAWINGS

Figure 1:
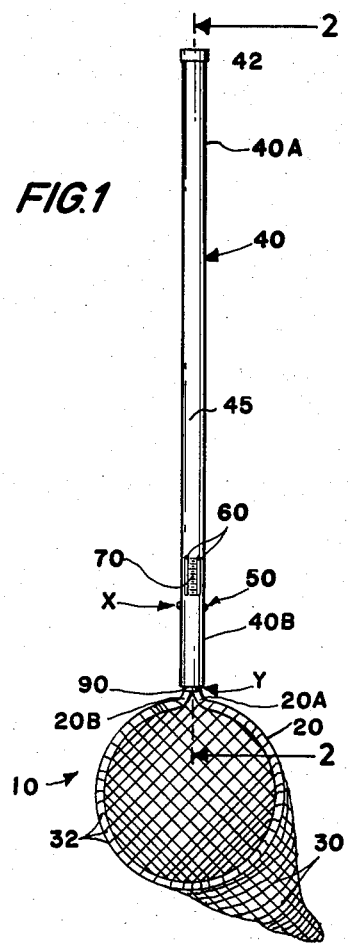
FIG. 1 is a front plan view of a Combination Fishing Net, Weight Scale and Length Scale constructed in accordance with the teachings of the present invention, illustrating the best mode thereof.
Figure 1A:
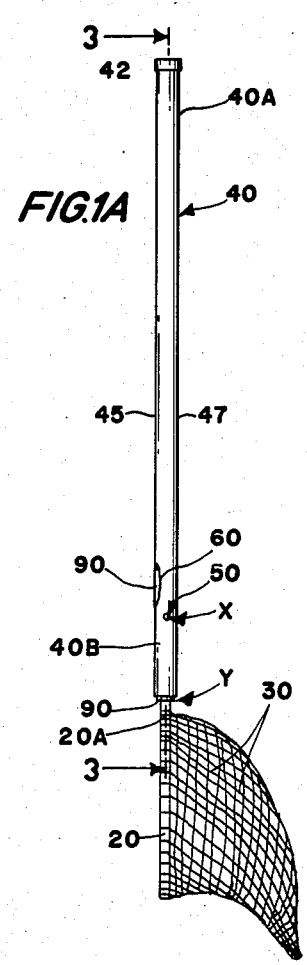
FIG. 1A is a right side view thereof.

A combination fish landing net, weight scale, and length scale constructed in accordance with the teachings of the best mode of the present invention has been generally designated in the appended drawings by the reference numeral 10. With initial reference to FIGS. 1 and 7, the combination landing net device is adapted to be used by a fisherman 12 for netting a game fish 15. The device generally comprises a hoop 20, a flexible net 30, an elongated handle portion generally designated by the reference numeral 40.

The hoop 20 comprises a length of lightweight, rust-proof, preferably aluminum tubing of uniform diameter formed into a generally circular configuration and terminating in a pair of hoop ends 20A and 20B. The hoop ends 20A and 20B are drawn together at the upper portion designated herein by the reference numeral 22 to close the circle of hoop 20. As best viewed in FIG. 5, tips 25 of hoop ends 20A and 20B are compressed in a generally concave configuration, whereby the diameter of hoop ends 20A and 20B is slightly reduced to provide a secure fit.

Hoop 20 is severed at point M near hoop end 20A (FIG. 11). A rigid plug 27 comprises a rigid shaft having ends 27A and 27B and a center ring 28. Ends 27A, 27B have an outer diameter slightly smaller than the interior diameter of hoop 20, and central, ring-like flange 28 has an outer diameter generally equivalent to the outer diameter of hoop 20. Ends 27A and 27B of rigid plug 27 are coaxially inserted into the hollow interior of hoop 20 and secured in position by a pair of conventional screws 29 which penetrate hoop 20, so that the screw heads are visible on the upper surface of hoop 20, and can be quickly and easily removed. When hoop 20 is closed, plug 27 is positioned with shaft ends 27A, 27B extending into the interior of the hoop, and the outer periphery of ring 28 extends out to meet the outer diameter of the hoop, thus providing a smooth bridge between the two hoop sections. The plug can be quickly and easily removed, the hoop opened, and the damaged net removed. Once the new net is properly in place upon the hoop, the plug can be easily reinserted into the hoop and secured in place with the screws.

A flexible, preferably mesh net 30 of suitable tensile strength for capturing game fish 15 is attached to hoop 20 by loops 32 tied about the hoop and secured by conventional knots.

The elongated, rigid handle portion 40 comprises a unitary, hollow, tubular shaft preferably of a rustproof, lightweight material such as aluminum, which is of suitable strength to support a netted fish. The upper portion 40A of handle 40 is sealed by a pliable preferably plastic cap 42 of similar molding to cover the rough cut edge 43 to assure the safety and comfort of the fisherman 12. Lower portion 40B of handle 40 terminates at open end Y. The outer surface, including front face 45 and rear face 47, is covered with a protective coating such as a rustproof enamel.

Figure 3:
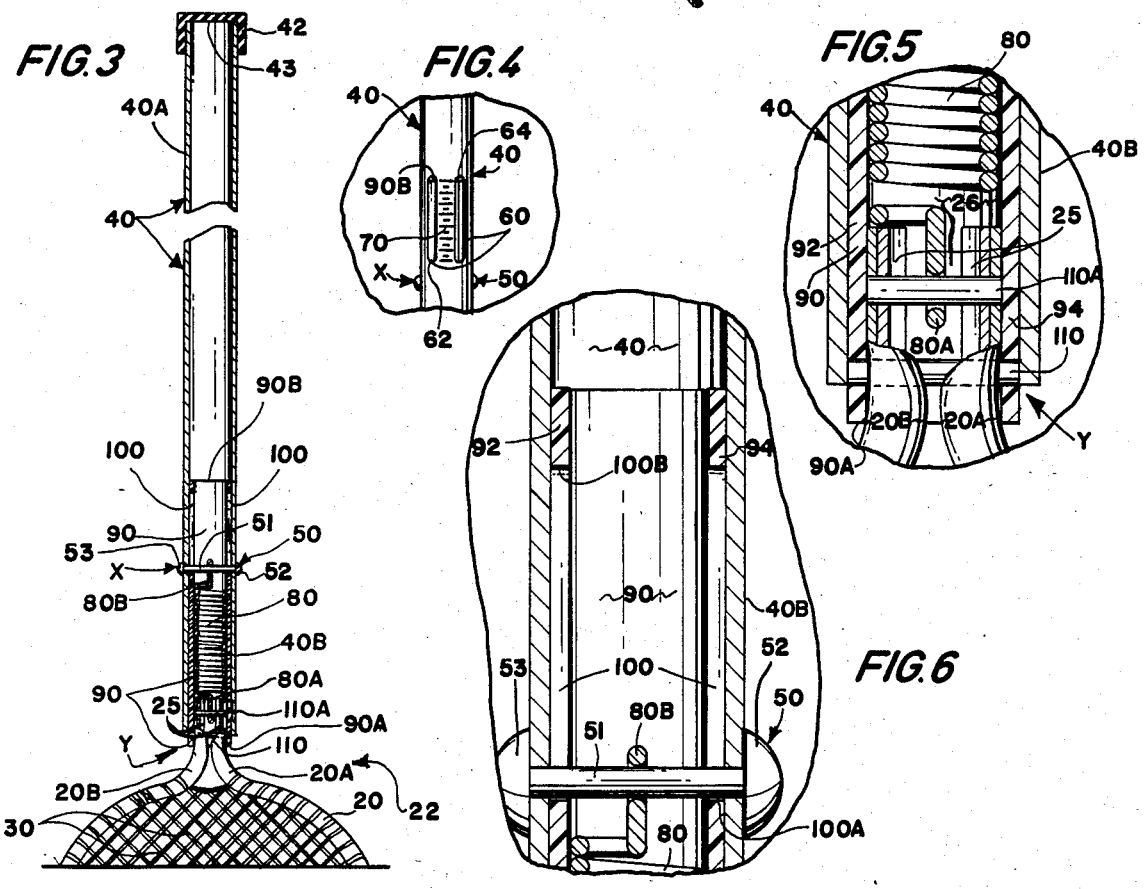
FIG. 3 is an enlarged scale, sectional view taken generally along lines 3—3 of FIG. 1B.
Figure 6:
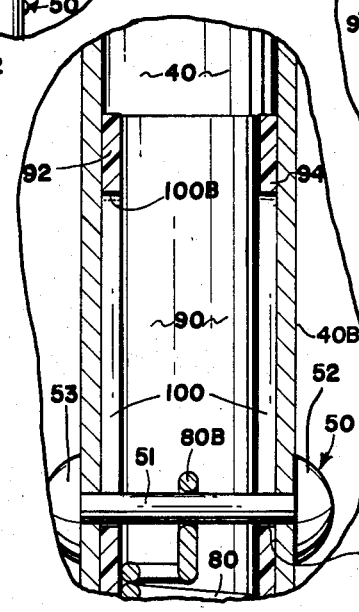
FIG. 6 is an enlarged scale, sectional, partial view of the upper interior spring-biasing pin area, similar to FIG. 3.

As best illustrated in FIGS. 3, 6, and 10, a rigid, preferably steel, fastener 50 penetrates handle 40 at point X. The shaft 51 of fastener 50 rests in coplanar alignment with hoop 20, and is secured by a pair of generally hemispherical or dome-like heads 52 and 53, which are roughly twice the diameter of fastener shaft 51.

Figure 4:
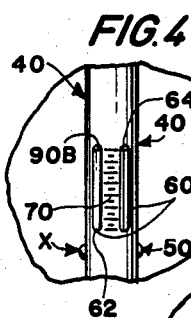
FIG. 4 is an enlarged scale, partial view of the weight scale portion of the handle.

With reference directed to FIGS. 4 and 9, a pair of elongated, generally rectangular, adjacent windows 60 are cut through front face 45 of handle 40. Windows 60 are in parallel alignment and extend along handle 40 from their lower end 62 at a point just above fastener 50 approximately two and one-half inches to their upper end 64. Numerical weight scale calibrations 70 beginning at zero at upper end 64 and increasing to a suitable maximum weights (e.g., twenty-two) at lower end 62 are clearly legible on the front face 45 of handle 40 between windows 60. The calibrations 70 may be stenciled or painted preferably in a highly visible color which clearly contrasts with the color of handle 40. The positioning of the scale calibrations 70 in this manner between windows 60 greatly facilitates accurate reading of the weight scale when the device is in use as described in detail in the following paragraphs.

Figure 2:
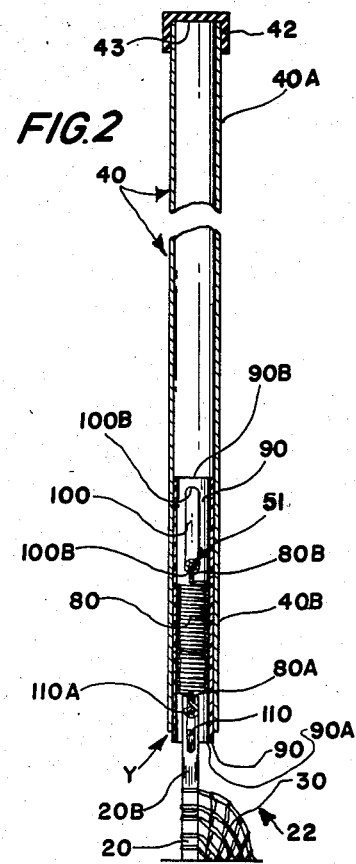
FIG. 2 is an enlarged scale, sectional view taken generally along lines 2—2 of FIG. 1.

With reference to FIGS. 2, 3, and 10, an expansible, preferably steel, spring generally designated by the reference numeral 80 comprises the weighing means of the present invention. Spring 80 terminates at each end in rigid loops 80A and 80B. Spring 80 is coaxially disposed within a rigid, elongated tube 90 of slightly greater diameter which is made of a rigid, phosphorescent or similar highly visible plastic material. Tube 90 is roughly one-third the length of handle 40 and is injection-molded to a diameter only slightly smaller than the interior diameter of handle 40 so that it may be precisely fitted in slidable, coaxial relation into the lower portion 40B of handle 40 as described in detail below. Tube 90 comprises lower portion 90A, upper portion 90B, and sides 92, 94.

As best viewed in FIG. 2, a pair of elongated, generally rectangular clearance slots 100 of equal length are cut in parallel alignment through opposite sides 92, 94 of upper portion 90B of tube 90. Clearance slots 100 are slightly less than half the length of tube 90. The lower end 100A of clearance slots 100 is spaced approximately four inches from lower end 90A of tube 90, and upper end 100B is spaced approximately one-fourth inch from upper end 90B of tube 90. Ends 100A and 100B are rounded so as to firmly encompass the tubular shaft 51 of fastener 50 when the device is in use as described below.

Figure 5:
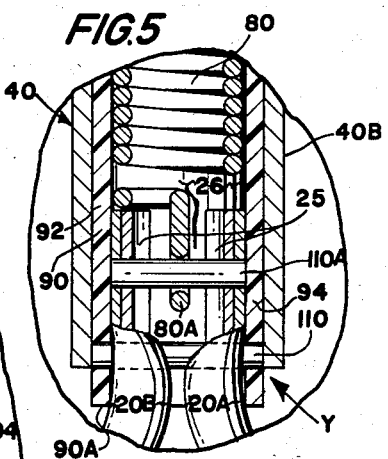
FIG. 5 is an enlarged scale, fragmentary, sectional, partial view of the lower interior spring-biasing pin area, similar to FIG. 3.

Reference is directed to FIGS. 3 and 5. When the device is assembled, the flexible net 30 is threaded onto hoop 20 and hoop ends 20A and 20B are compressed to a slightly reduced diameter as previously described and secured in substantially parallel, spaced-apart position by rigid pin 110A. Pin 110A transverses the space 26 between the compressed tips 25 of hoop ends 20A and 20B and securely captures lower spring loop 80A. Spring 80, thus securely connected to hoop ends 20A and 20B, is then inserted into the lower end 90A of tube 90, so that spring 80 and hoop ends 20A, 20B are securely fitted in coaxial alignment within tube 90. When the hoop ends are properly secured within tube 90, hoop 20 rests in coplanar alignment with pin 110A.

Hoop ends 20A and 20B are then secured in spaced apart position within tube 90 by a rigid rivet 110, which passes through the lower end 90A of tube 90 at opening Y and transverses the space 26 between the hoop ends. Rivet 110 is disposed parallel to pin 110A and in coplanar alignment with hoop 20. Rivet 110 functions to prevent torsional displacement of hoop 20 relative to tube 90, thus assuring an accurate weight measurement. As best viewed in FIGS. 2 and 3, spring 80 extends upwardly approximately one-half the length of tube 90 when hoop 20 is secured within the tube as previously described, so that upper spring loop 80B comes into alignment with the lower ends 100A of clearance slots 100.

The secured tube and hoop assembly is then slidably inserted at point Y into the opening at the lower end 40B of handle 40 and positioned in coaxial alignment with handle 40. When the tube assembly is thus correctly positioned within handle 40, the upper end 90B of tube 90 becomes aligned with the upper end 64 of windows 60 on the front face 45 face of handle 40 (FIG. 4). As best viewed in FIG. 6, clearance slots 100 in sides 92, 94 of tube 90 become aligned at point X on handle 40, such that the plane formed by clearance slots 100 is perpendicular to the plane of windows 60. Shaft 51 of fastener 50 is then inserted through suitable orifices provided in handle 40 at point X and passes through lower ends 100A of clearance slots 100 to capture spring loop 80B. Assembly of the device is therefore facilitated, since spring 80 is easily secured without tensioning.

Limited longitudinal movement of interior tube 90 relative to handle 40 is facilitated by clearance slots 100 while torsional displacement thereof is prevented by parallel fastener 50 and rivet 110. Fastener 50 is then secured by fastener heads 52 and 53.

When the device is thus completely assembled, hoop 20 is positioned in coplanar alignment with fastener 50, windows 60, rivet 110, and pin 110A, and the opening of net 30 is coplanar with the front face 45 of handle 40, the body of net extending rearwardly from hoop 20.

With reference directed to FIG. 8, a length scale 120 is provided on the rear face 47 of handle 40. Scale 120 begins at zero at a point near the lower end 40B and increasing toward upper end 40A of handle 40 away from hoop 20. The scale 120 is preferably indicated in a color which highly contrasts to the color of handle and may comprise a pre-printed ruler decal or painted or stenciled numerals. The advantageous placement of length scale 120 on the rear face 47 of handle 40 permits the user to simply manuever the device to obtain the accurate length measurement without having to remove the fish 15 from net 30.

Operationally, when landing a fish 15, fisherman 12 grasps the landing net device 10 at the lower end 40B of handle 40, so that the hoop portion 20 extends outwardly in a position generally perpendicular to the fisherman's body. Once a fish 15 has been correctly netted, fisherman 12 may then easily manipulate the landing net 10 to a "vertical" position, as shown in FIG. 7, so that the elongated handle 40 is firmly grasped by the fisherman and the flexible net 30 extends downwardly toward the fisherman's feet. The weight of the fish pulls the net 30 to a "closed" position, so that the netted fish 15 cannot escape.

Responsive to the weight of the netted fish, hoop 20 is pulled downwardly, spring 80 is extended, and tube 90 is telescopingly pulled from within the tubular handle 40. The movement of the brightly contrasting tube 90 relative to handle 40 is clearly seen through the rectangular windows 60 on the front face 45 of the handle. The weight scale markings 70 on front face 45 of handle 40 between windows 60 accurately correspond to the degree of downward movement of the tube 90 from within the handle and can be easily read while the fish is in the net. Thus an accurate "fresh" weight reading can be obtained immediately after the catch.

The fisherman 12 may likewise immediately determine the length of the captured fish 15 without removing the fish from the net 30. The fisherman 12 may simply rotate the device 10 approximately 180 degrees, until handle 40 extends downwardly toward the fisherman's feet and hoop 20 extends upwardly above handle 40. The weight of the netted fish 15 will exert a downward pull on flexible net 30, so that the net drapes across the length scale calibrations 120 provided on the rear face 47 of handle 40. By merely holding the fish 15 in position against the length scale 120, the fisherman can easily obtain a precise length measurement. This simple manipulation can be accomplished with relative ease without permitting the net to fall open and risking the possible escape of the captured fish.

If the net 30 becomes stretched, weakened, or torn during use, the fisherman may quickly loosen screws 29 and "open" the hoop by removing plug 27. By slightly widening the gap between the two hoop portions, the fisherman 12 may easily slide net loops 32 off the hoop. A replacement net can then be quickly and easily looped onto the hoop. When the replacement net is thus in position, ends 27A, 27B of plug 27 may be reinserted into the interior of hoop 20 and secured in place by tightening screws 29.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A fishing implement combining a landing net, a fish weighing scale, and a fish measuring scale, said implement comprising:

flexible mesh net means adapted to at least temporarily manipulate and/or contain a fish, said net means having a periphery;

rigid hoop means for supporting said net means, said hoop means comprising a substantially circular body portion for engaging at least a portion of the periphery of said net, said body portion occupying a plane, and said hoop means terminating in a pair of substantially straight, adjacent end portions squeezed together in substantially parallel relation coplanar with said last mentioned plane to present a reduced diameter coupling end;

intermediate tube means having a diameter greater than the diameter of said coupling end for coaxially receiving said hoop means coupling end, said tube means having a predetermined length, a first end and an open second end spaced apart from said first end, and said tube means comprising a first transverse fastener extending through said first tube end and said reduced diameter coupling to rigidly operatively secure said hoop means to said tube means;

said intermediate tube means comprising a pair of cooperating, spaced apart elongated and aligned clearance slots disposed near said second end at a first distance apart from said hoop means coupling end, each of said slots having a length less than half of said predetermined length of said tube means;

expansible spring means coaxially disposed within said tube means, said spring means having a first terminal end secured within said tube means and penetrated by said first fastener means and a second terminal end extending toward said tube means open second end which terminates between said clearance slots whereby said spring means may be subsequently conveniently engaged in assembly;

elongated, unitary handle means of rigid, tubular construction for manipulating said implement, said handle means having a unitary diameter greater than said intermediate tube means diameter, and said handle means comprising an upper portion for providing a convenient manual grip and a spaced apart bottom portion adapted to coaxially receive said intermediate tube means in telescoping relation relative to said handle means;

assembly orifice means defined in said handle means and positioned such that, when said intermediate tube means is coaxially fitted within said handle means during assembly of said implement, said assembly orifice means will be aligned with said spring means second terminal end;

second fastener means operatively associated with said handle means bottom portion for extending transversely between said handle assembly orifice means and through said tube means slots, said second fastener means penetrating said second terminal end of said spring means to operatively capture same;

whereby said intermediate tube means and thus said hoop and mesh net may be coaxially withdrawn from said handle means against yieldable bias from said spring means and torsional displacement of said tube means relative to said handle means is resisted by said second fastener means;

slot-like window means defined in said handle means for permitting viewing of said tube means;

calibrated weight markings defined on said handle means adjacent said window means whereby to permit the visual determination of fish weight in response to the withdrawal of said tube means from said handle means when said net is used to handle a fish by looking through said window means to observe the position of said tube means relative to said weight markings, said calibrated markings beginning with a zero position;

said assembly orifice means being so positioned such that said second fastener means may be correctly attached in assembly without stretching the handle or tube against said spring means and said tube means second end will align with the zero point of said weight markings to provide correct tare weight; and, said handle means comprises an elongated measuring scale for determining fish weight, said measuring scale extending from a zero point closely adjacent said bottom portion of said handle means so that length measurements may be made by moving the fish only a minimal distance from said hoop means.

2. The implement as defined in claim 1 wherein said substantially circular body portion of said hoop means comprises intermediate end portions normally secured together, but adapted to be manually separated from one another when desired to remove or change said mesh net means.

3. The implement as defined in claim 2 wherein said intermediate end portions are removably coupled together by plug means comprising a pair of opposite ends each adapted to be coaxially fitted within said body portion intermediate ends and a a larger diameter flange portion defined between said last mentioned opposite ends.

4. The implement as defined in claim 3 wherein the diameter of said plug means flange portion is substantially equal to the diameter of said hoop means intermediate end portions.

5. An implement for fishing which combines a landing net, a fish weighing scale, and a fish measuring scale, said implement including:

flexible mesh net means adapted to at least temporarily manipulate and/or contain a fish, said net means having a periphery;

rigid hoop means for supporting said net means, said hoop means including a substantially circular body portion for engaging at least a portion of the periphery of said net, said body portion occupying a plane, and said hoop means terminating a pair of substantially straight, adjacent end portions squeezed together in substantially parallel relation coplanar with said last mentioned plane to present a reduced diameter coupling end;

intermediate tube means having a diameter greater than the diameter of said coupling end for coaxially receiving said hoop means coupling end, said tube means having a predetermined length, a first end and an open second end spaced apart from said first end, and said tube means including a first transverse fastener extending through said first tube end and said reduced diameter coupling to rigidly operatively secure said hoop means to said tube means;

said intermediate tube means including a pair of cooperating, spaced apart elongated and aligned clearance slots disposed near said second end at a first distance apart from said hoop means coupling end, each of said slots having a length less than half of said predetermined length of said tube means;

expansible spring means coaxially disposed within said tube means, said spring means having a first terminal end secured within said tube means and penetrated by said first fastener means and a second terminal end extending toward said tube means open second end which terminates between said clearance slots whereby said spring means may be subsequently conveniently engaged in assembly;

elongated, unitary handle means of rigid, tubular construction for manipulating said implement, said handle means having a unitary diameter greater than said intermediate tube means diameter, and said handle means including an upper portion for providing a convenient manual grip and a spaced apart bottom portion adapted to coaxially receive said intermediate tube means in telescoping relation relative to said handle means;

assembly orifice means defined in said handle means and positioned such that, when said intermediate tube means is coaxially fitted within said handle means during assembly of said implement, said assembly orifice means will be aligned with said spring means second terminal end;

second fastener means operatively associated with said handle means bottom portion for extending transversely between said handle assembly orifice means and through said tube means slots, said second fastener means penetrating said second terminal end of said spring means to operatively capture same;

whereby said intermediate tube means and thus said hoop and mesh net may be coaxially withdrawn from said handle means against yieldable bias from said spring means and torsional displacement of said tube means relative to said handle means is resisted by said second fastener means;

slot-like window means defined in said handle means for permitting viewing of said tube means;

calibrated weight markings defined on said handle means adjacent said window means whereby to permit the visual determination of fish weight in response to the withdrawal of said tube means from said handle means when said net is used to handle a fish by looking through said window means to observe the position of said tube means relative to said weight markings, said calibrated markings beginning with a zero position;

said assembly orifice means being so positioned such that said second fastener means may be correctly attached in assembly without stretching the handle or tube against said spring means and said tube means second end will align with the zero point of said weight markings to provide correct tare weight; and, said handle means includes an elongated measuring scale for determining fish weight, said measuring scale extending from a zero point closely adjacent said bottom portion of said handle means so that length measurements may be made by moving the fish only a minimal distance from said hoop means.

6. The implement as defined in claim 5 wherein said substantially circular body portion of said hoop means includes intermediate end portions normally secured together, but adapted to be manually separated from one another when desired to remove or change said mesh net means.

7. The implement as defined in claim 6 wherein said intermediate end portions are removably coupled together by plug means including a pair of opposite ends each adapted to be coaxially fitted within said body portion intermediate ends and a larger diameter flange portion defined between said last mentioned opposite ends.

8. The implement as defined in claim 7 wherein the diameter of said plug means flange portion is substantially equal to the diameter of said hoop means intermediate end portions.

* * * * *